United States Patent
Schmitz

(10) Patent No.: US 7,866,928 B2
(45) Date of Patent: Jan. 11, 2011

(54) PLUG AND METHOD FOR FIXING AT LEAST TWO DEVICES

(75) Inventor: Guenter Schmitz, Jesteburg (DE)

(73) Assignee: Airbus Deutschland GmbH, Hamburg (DE)

( * ) Notice: Subject to any disclaimer, the term of this patent is extended or adjusted under 35 U.S.C. 154(b) by 700 days.

(21) Appl. No.: 11/832,882

(22) Filed: Aug. 2, 2007

(65) Prior Publication Data

US 2008/0029667 A1    Feb. 7, 2008

Related U.S. Application Data

(60) Provisional application No. 60/821,149, filed on Aug. 2, 2006.

(30) Foreign Application Priority Data

Aug. 2, 2006   (DE) ................ 10 2006 036 083

(51) Int. Cl.
*F16B 13/06* (2006.01)

(52) U.S. Cl. ................ 411/34; 24/458; 215/359; 403/408.1

(58) Field of Classification Search ............. 411/34; 403/408.1, 409.1; 24/458; 220/338; 215/359; 292/257

See application file for complete search history.

(56) References Cited

U.S. PATENT DOCUMENTS

| RE14,630 | E * | 4/1919 | Abbott ................ 215/359 |
| 4,892,216 | A * | 1/1990 | Scott ............... 220/203.07 |
| 5,931,516 | A * | 8/1999 | Holtman et al. ......... 292/257 |
| 6,202,265 | B1  | 3/2001 | Caine |
| 6,659,513 | B1 * | 12/2003 | Ramsauer .............. 292/66 |
| 6,834,770 | B2 * | 12/2004 | Lo ................... 220/212.5 |

FOREIGN PATENT DOCUMENTS

WO    99/35046 A1    7/1999

* cited by examiner

*Primary Examiner*—Gary Estremsky
(74) *Attorney, Agent, or Firm*—Christopher Paradies; Fowler White Boggs P.A.

(57) ABSTRACT

A plug and a method for fixing at least two devices, includes a tension element, a pin, a lever element and a compression element. In one example, the tension element includes a tension stamp on a first end and a coupling member on a second end and a lever element includes a first sliding and a coupling element, with the pin coupling the lever element with the tension element. A compression element having an area-shaped contact that is capable of sliding onto the tension element until the area-shaped contact contacts the tension stamp. When the lever element is coupled to the tension element by a pin and is engaged by using a lever movement, a compression element is compressed by shortening a distance between the tension stamp and the lever element.

4 Claims, 3 Drawing Sheets

PLUG AND METHOD FOR FIXING AT LEAST TWO DEVICES

REFERENCE TO RELATED APPLICATION

This application claims the benefit of the filing date of German Patent Application No. 10 2006 036 083.4 filed. Aug. 2, 2006 and of U.S. Provisional Patent Application No. 60/821,149 filed Aug. 2, 2006, the disclosures of which applications are hereby incorporated herein by reference.

FIELD OF THE INVENTION

The field relates to a plug and a related method suitable for fixing at least two devices, in particular for fixing devices of an aircraft. The devices to be fixed may be panels, wherein a first panel is, for example, connected to the aircraft body, while a second panel forms, for example, part of a housing for electronic devices.

BACKGROUND OF THE INVENTION

In order to fix such devices together, a known plug made by Hartwell Corp., U.S.A., comprises a socket and a plunger that may be inserted into the socket. In this arrangement, the socket is inserted, with a degree of initial tension, into a first through-opening in the form of a hole within a lower device, wherein the socket is longer, by a projecting section, than the depth of the hole. The second device, approximately in the form of a movable plate, with a further through opening, is placed over the first through-opening, wherein the device surfaces that follow on from the through-openings are resting against each other. Finally, the plunger is plugged through the through-opening of the top device and of the socket. As a result of this, the projecting section of the socket opens up. With the use of complementary detent means on the socket and on the plunger, the plug-type connection established in this way is prevented from becoming undone. The plug may only be undone, i.e., the detent means nay only be decoupled, when there is sufficient tensile force. However, the plug may also be undone when it is destroyed.

Plugs that are used in the field of aeronautical engineering have to meet particularly stringent requirements. On the one hand, the connection of the devices, which connection has been established by the plugs, must be permanent and secure, and must withstand in particular the considerable vibrations, peak loads and load transfers that act on the devices and that are finally transmitted to the plugs. On the other hand, it is often desirable for the plugs to be easily unpluggable so as to undo the connection of the devices and to make it possible for the same plug to establish a new connection without the plug's components already suffering excessive material fatigue.

SUMMARY OF THE INVENTION

Among other things, it may be an object of the plug to propose a plug that meets the above-mentioned requirements. Furthermore, it may be an object of the plug to propose a method that allows for permanent connection of at least two devices that may nevertheless easily be undone by the plug.

The plug may comprise a tension element, a pin, a lever element and a compression element. It is understood that the pin and the tension element may be designed in one piece. In this case, the lever element may comprise a groove by means of which the pin may lock into its final position. Likewise, the pin and the lever element may be designed in one piece, wherein in this case, the tension element may comprise corresponding detent means for accommodating the pin.

The method for fixing may be based on the method, known per se, for sealing juice bottles; however, according to one example, the method applies a different effect within a completely different field of application. As is known, in the sealing method, a slip-on top is placed onto the bottle to be sealed. On the face of the slip-on top, there is a lever, whose eccentric sliding region allows for movement of a tension device with a stamp opposite the lever; in other words, to vary the distance between the stamp and the top region of the slip-on top. A compression element, made of rubber or some compressible plastic, where the compression element is located between the top region and the stamp, encases the corresponding section of the tension device and is compressed when the length is shortened. This compression results in the radial diameter of the compression element increasing, as a result of which the bottle is finally sealed.

In the case of the object of the embodiment, too, its use may be associated with a certain sealing effect, which is altogether desirable. The compression element may be at least partly or entirely outside the through-opening of the components. If the compression element is compressed, it may establish contact with an edge region of an opening cross section of the through-opening that is nearest to it. The static friction provided by the contact may has an advantageous effect in that, as a result of a change in shape of the compression element, any forces that act laterally on the devices are dampened.

Furthermore, in its pressed state, the compression element may have a certain centering effect on the position of the plug within the through-holes. As a result of the centering effect, for example, the play between the through-holes and the non-compressible elements of the plug may be increased. This not only results in improved installability, but it also prevents in a particular elegant manner, any direct effect of lateral forces acting on non-compressible elements of the plug, in particular of the tension element.

Improved guidance is achieved in that the plug comprises a guide sleeve that may be pushed onto the tension element such that it establishes area-shaped contact with the compression element. Furthermore, the guide sleeve results in easier sliding of the tension element. The outside diameter of the guide sleeve depends on the through-openings.

In this arrangement, the use of a guide sleeve is advantageous, where the guide sleeve by means of different outside diameters, matches panels or metal sheets with holes of different sizes. Without the sleeve, in the case of different hole diameters there would be a danger of the tension element shearing from the edges of the holes, where the edges would then not be flush against each other, where the danger may be effectively prevented by the guide sleeve that forms part of the plug.

The above-mentioned advantageous dampening characteristics of the plug may be further developed in that the guide sleeve accommodates O-rings in matching grooves. These O-rings are particularly well suited to dampening lateral forces that act on the devices and thus indirectly also on the plug. Furthermore, the O-rings may be helpful in installing the plugs because they may prevent the guide sleeve from sliding through the device or devices. Moreover, by means of the O-rings, it becomes possible to compensate for through-holes of the devices not being exactly placed one over the other; with the use of O-rings, the guide sleeve of the plug may be arranged relatively free of tension within the two through-holes, and in particular, the outside diameters of the guide sleeve could be considerably smaller than the corresponding inside diameters of the through-openings of the devices.

The guide sleeve itself could provide further dampening means, for example, in that it comprises a disc-shaped collar which comes to rest between the two devices to be fixed.

An embodiment finally provides for the plug to comprise a limit stop element that may be made to contact the guide sleeve.

According to one embodiment, the plug may comprise only three elements. These elements may be: the lever element, the tension element and the compression element. In this case, the lever element would have to be adequately dimensioned for it to carry out a limit stop function in the sense of an abutment to the stamp of the tension element for compression, where the function is otherwise carried out by the limit stop element. In the case, of a three-part plug, the compression element would have to extend from the tension stamp right through to the lever element.

BRIEF DESCRIPTION OF THE FIGURES

Below, the plug is explained in more detail by means of embodiments. The following are shown.

DETAILED DESCRIPTION

The examples described and drawings rendered are illustrative and are not to be read as limiting the scope of the invention as it is defined by the appended claims.

Figure 1:
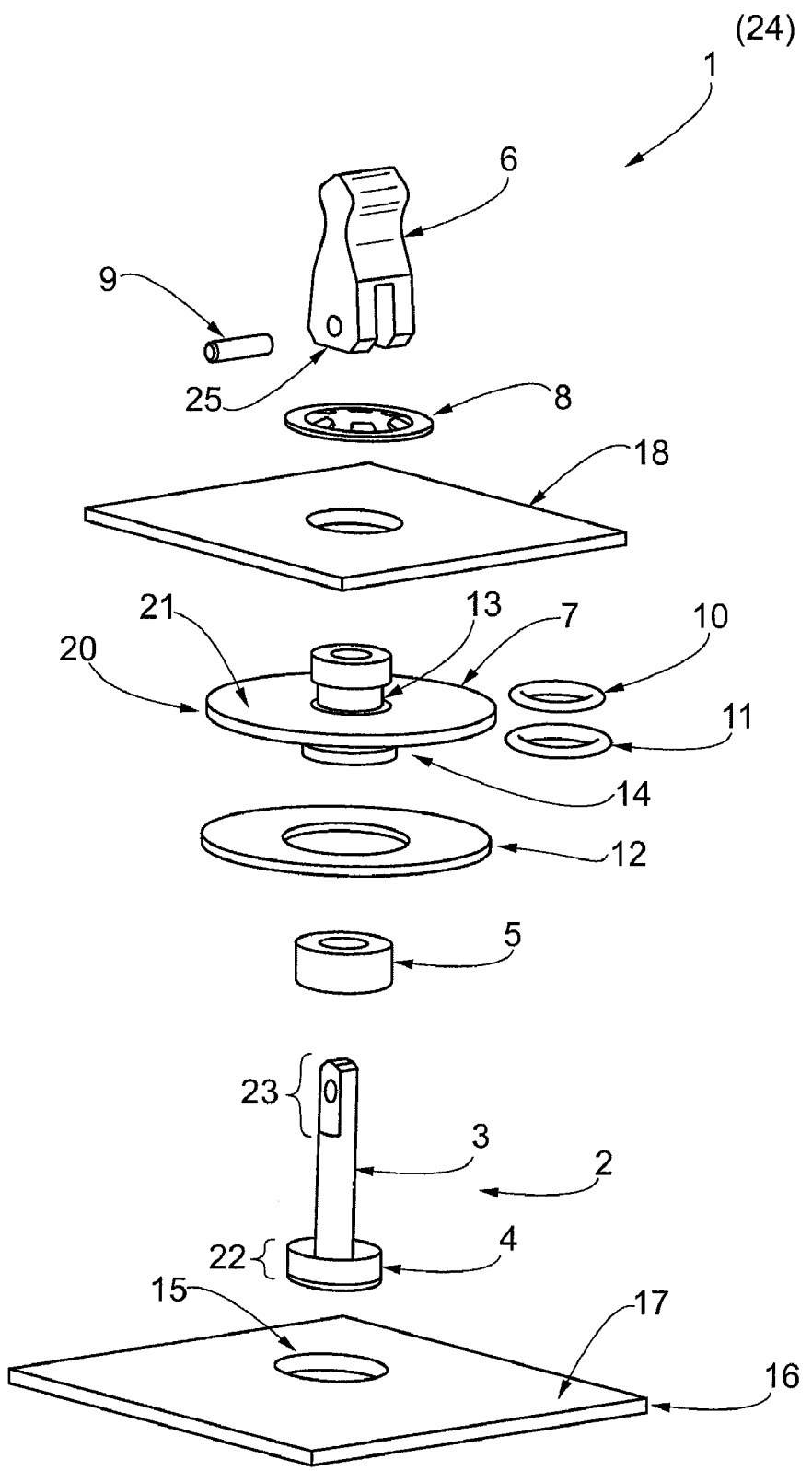
FIG. 1 shows an exploded view of an example of a plug with two devices.

A plug 1 such as illustrated in FIG. 1, may comprise a tension element 2, such as the one shown in FIG. 1, which is made of a thermoplastic material. The tension element 2 comprises a coupling member 23 on one end of a tension rod 3 and a tension stamp 4 on the opposite end of tension rod 3. As an alternative, the tension element may be made of a metal, for example. The plug 1 includes a compression element 5, which may be made of silicon. When assembling the plug 1, the compression element 5 may slide onto the tension rod 3 of the tension element 2 and may contact the tension stamp 4. Furthermore, the plug 1 comprises a lever element 6; a guide sleeve 7; and a limit stop element, such as a captive lock washer 8, that may be snapped into a groove 13 of the guide sleeve 7; and a pin 9 used for coupling the lever element 6 to the coupling member 23 of the tension element 2.

The plug 1 of the embodiment is assembled and installed as follows: two O-rings 10, II are placed on the guide sleeve 7. To this effect the O-ring 10 is fitted into the groove 13, while the O-ring 11 is fitted into the groove 14 of the guide sleeve 7.

First, the compression element 5 and then the guide sleeve 7 are placed on the tension rod 3. Before the tension element 2 is inserted into the through-opening 15 of a first lower device 16, a non-slip film 12 may be arranged on the upward facing side 17 of the device 16. The guide sleeve 7 comprises a disc-shaped collar 20 which is arranged above the non-slip film 12 thus covering it completely. For example, a second non-slip film 12 may also be used for the top 21 of the disc-shaped collar 20.

When the tension element 2 with the compression element 5 and the guide sleeve 7 is inserted in the device 16, a further, top device 18 may be pushed on above the first component 16 in that a through-opening 19 of the top device 18 partly accommodates the preassembled plug 1.

Figure 3:
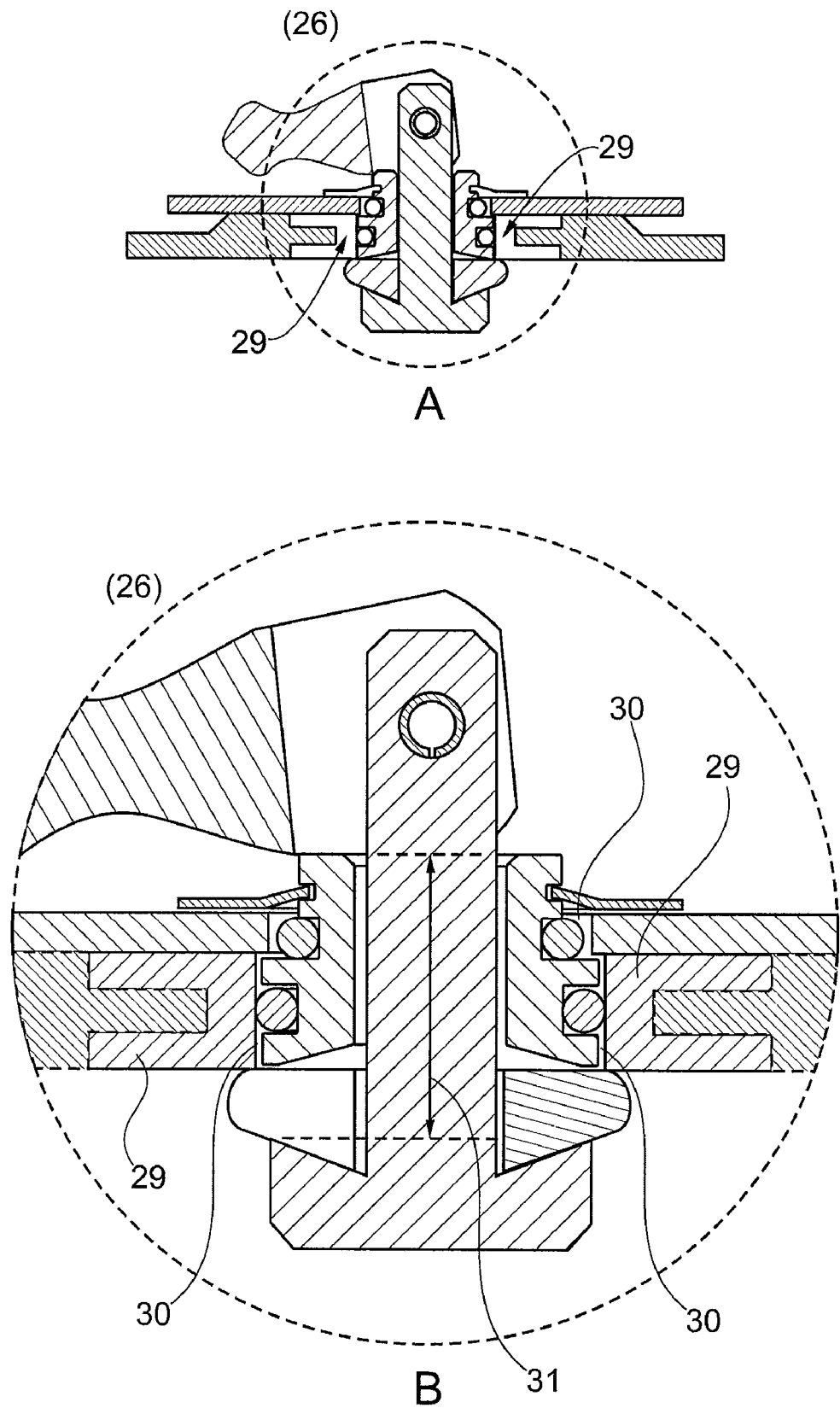
FIG. 3A illustrates the plug of FIG. 2, assembled and in a cross sectional view.
FIG. 3B shows a detailed cross sectional view of a portion of FIG. 3A.

By way of the guide sleeve 7, which projects after the top device 18 has been pushed on, the limit stop element 8 is slipped on until it clicks into a groove of the guide sleeve 7. By means of the pin 9, the lever element 6 is coupled with the coupling member 23 of the tension element 2. For example, this allows the lever element to be positioned as illustrated in FIG. 1, with a first sliding face 25 facing the limit stop 8. In the position shown in FIG. 3, the distance between the first sliding face 25 of the lever element 6 and the tension stamp 4 is at its maximum. The distance 31 between a second sliding face 26 and the tension stamp is shown in FIG. 3. If the lever element 6 is tilted over, such that the intermediate sliding face 24 faces the guide sleeve 7, in an intermediate position (not shown), a minimum clearance between the intermediate sliding face 25 of the lever element 6 and the tension stamp 4 is achieved. The distance 31 as shown in FIG. 3 slightly increased compared to this intermediate position. The distance, as shown FIG. 3, is less than the distance between the first sliding face 25 and the tension stamp 4, when the lever element 6 is positioned as shown in FIG. 1. The compression element 5 is compressed as shown in FIG. 3, such that it extends beyond the through opening 15 of the device 16 because the diameter of the compression element 15 is larger than that of the through-opening 15 when compressed. As a result of a dampening means such as O-rings 10, 11, a non-slip film 12 and the compression element 5, the plug 1 is effectively dampened in particular in relation to forces acting laterally on the devices 16, 18. The non-slip film 12 reduces or prevents slipping between a first device 16 and a second device 18, when the compression element 5 is compressed by the lever element 6 being engaged such that the second sliding face 26 is facing the guide sleeve 7.

In one example the guide sleeve is slidably mountable on the tension element such that the guide sleeve contacts the compression element.

Figure 2:
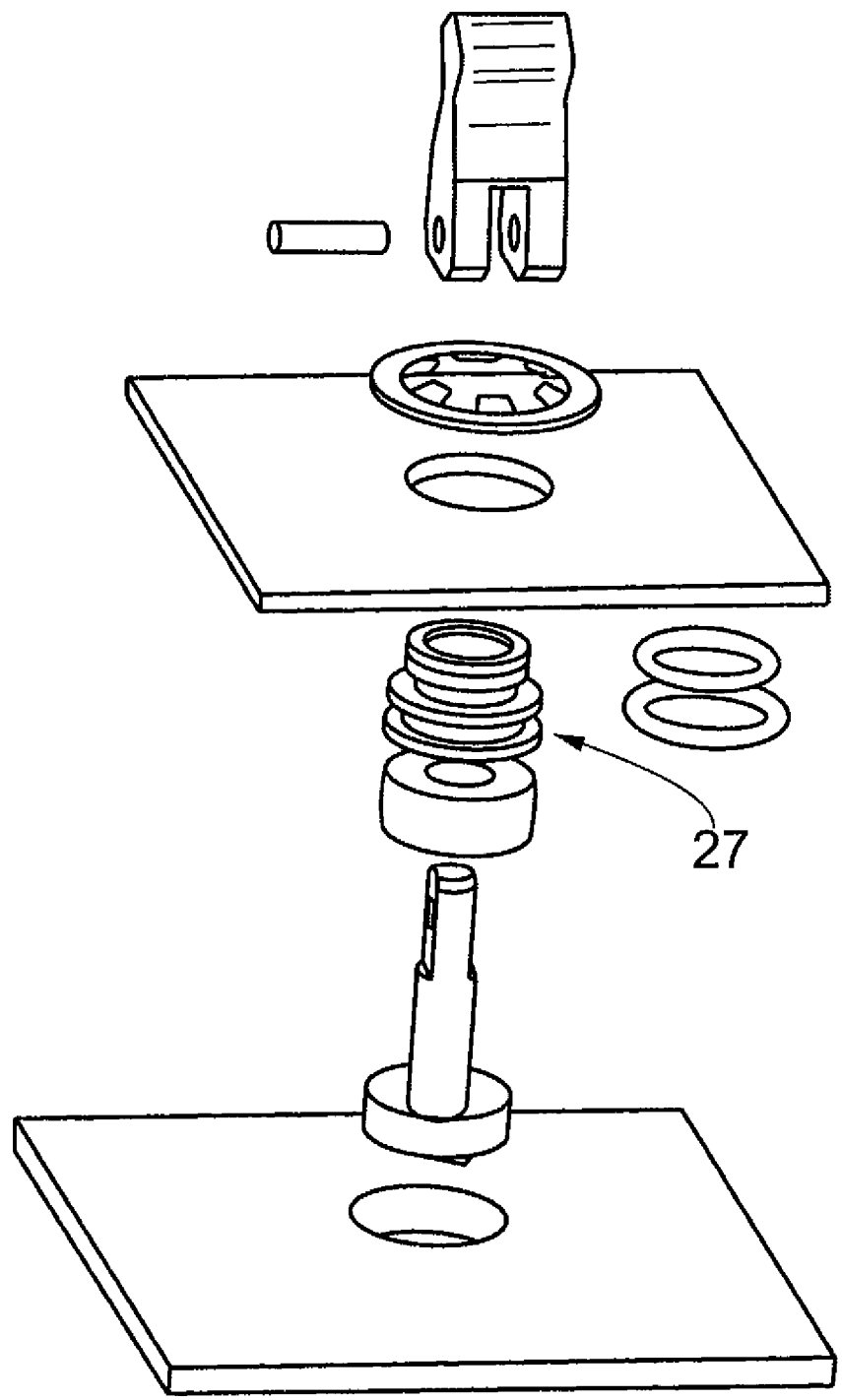
FIG. 2 illustrates another example of a plug in an exploded view.

Another example of a plug 100 is illustrated in FIG. 2 and FIGS. 3A and 3B. The bottom component 28 includes an insertion packing 29. Adequate play is provided between the components 18, 28 and the plug 00. The clearances 30, 32 provided for this purpose make it possible for the devices to be displaced to a certain extent relative to each other without this directly affecting the plug 100. Such displacement may be caused by the different coefficients of thermal expansion of the devices, for example, such that the devices may expand differently at temperature fluctuations as they are regularly encountered during operation of an aircraft. The plug 100 may thus be held without any tension as far as lateral forces are concerned. As an alternative to a guide sleeve 7 as shown in FIG. 1, a guide sleeve 27, shown in FIG. 2, has no disc-shaped collar 20.

In addition, it should be pointed out that "comprising" does not exclude other elements or steps, and "a" or "one" does not exclude a plural number. Furthermore, it should be pointed out that characteristics or steps which have been described with reference to one of the above embodiments may also be used in combination with other characteristics or steps of other embodiments described above. Reference characters in the claims are not to be interpreted as limitations.

Alternative combinations and variations of the examples provided will become apparent based on this disclosure. It is not possible to provide specific examples for all of the many possible combinations and variations of the embodiments described, but such combinations and variations may be claims that eventually issue.

LIST OF REFERENCE CHARACTERS

1 Plug
2 Tension element
3 Tension rod
4 Tension stamp
5 Compression element
6 Lever element
7 Guide sleeve
8 Limit stop element
9 Pin
10 O-ring
11 O-ring
12 Non-slip film
13 Groove
14 Groove
15 Through-opening
16 Device
17 Side
18 Device
19 Through-opening
20 Collar
21 Top
22 Stamp section
23 End section
24 Intermediate sliding face
25 First sliding face
26 Second sliding face
27 Guide sleeve
28 Device
29 Insertion packing
30 Clearances

What is claimed is:

1. A plug for fixing at least two devices, comprising:
a tension element having a tension stamp on a first end and a coupling member on a second end;
a pin;
a lever element having a first sliding face and a coupling element such that the pin is capable of coupling the coupling element of the lever element with the coupling member of the tension element;
a compression element having an area-shaped contact such that the compression element is capable of sliding onto the tension element until the area-shaped contact contacts the tension stamp, and when the lever element is coupled to the tension element by the pin and the lever element is engaged using a lever movement, the compression element is compressed by shortening a distance between the tension stamp and the lever element;
a guide sleeve slidably mounted onto the tension element such that the guide sleeve contacts the compression element, wherein the guide sleeve includes a plurality of grooves;
a plurality of O-rings accommodated in at least a plurality of the plurality of grooves; and
a limit stop element capable of engaging one of the plurality of the grooves.

2. The plug of claim 1, wherein the guide sleeve comprises a disc-shaped collar.

3. The plug of claim 1, wherein the limit stop element is a captive lock washer.

4. A method for fixing at least two devices, each having a through hole diameter, by means of the plug of claim 1, comprising:
disposing the plug of claim 1 in through-openings of each of the at least two devices; and
compressing the compression element of the plug of claim 1 using the lever movement of the lever element until the limit stop element engages one of the plurality of the grooves of the guide sleeve of the plug of claim 1.

* * * * *